United States Patent [19]

Farrand et al.

[11] Patent Number: 5,410,706
[45] Date of Patent: Apr. 25, 1995

[54] COMPUTER SYSTEM HAVING A REMOTE REBOOT FACILITY WITH BOTH HARD AND SOFT RESET CAPABILITIES

[75] Inventors: Scott C. Farrand, Tomball; Thomas J. Hernandez; Richard A. Stupek, both of Houston; Richard P. Mangold, Tomball; Darren J. Cepulis, Houston; Paul R. Fulton, Plano, all of Tex.

[73] Assignee: Compaq Computer Corporation, Houston, Tex.

[21] Appl. No.: 193,512

[22] Filed: Feb. 8, 1994

Related U.S. Application Data

[63] Continuation of Ser. No. 756,506, Sep. 9, 1991, abandoned.

[51] Int. Cl.$^6$ ............................................. G05B 23/02
[52] U.S. Cl. .................................... 395/700; 395/200; 395/325; 395/500; 364/DIG. 1; 364/221; 364/280; 364/280.2; 364/280.3
[58] Field of Search ............... 395/700, 200, 500, 775, 395/325; 364/280, 280.2, 280.3, 221

[56] References Cited

U.S. PATENT DOCUMENTS

| | | | |
|---|---|---|---|
| 4,257,095 | 3/1981 | Nadir | 364/200 |
| 4,686,526 | 8/1987 | Gritzo | 340/825.06 |
| 4,739,310 | 4/1988 | Yamamoto | 340/365 |

FOREIGN PATENT DOCUMENTS

WO86/02183  4/1986  European Pat. Off. .
59-027647  2/1984  Japan .

OTHER PUBLICATIONS

IBM Technical Disclosure Bulletin, "Automatic Hardware Detection of Personal Computer Software Sustem Resets and Re-Initial Program Load", vol. 31, No. 8, pp. 162-164, Jan. 1989.

Primary Examiner—Kevin A. Kriess
Assistant Examiner—Jon Hall Backenstose
Attorney, Agent, or Firm—Johnson & Wortley

[57] ABSTRACT

A remote system reboot facility effects reboots by resetting the central processing unit within a local or host console and by effecting a bus reset. The remote system reboot facility is actuated by signals transmitted over an asynchronous line from a remote console to a computer system manager within the host. The computer system manager, and possibly also a keyboard controller associated with the computer system manager, generates or generate the reset signals. Effectively, cold booting is accomplished by the remote simulating the effect of power cycling on the host and warm booting is accomplished by emulation of "control"—"alt"—"del" keystrokes.

10 Claims, 4 Drawing Sheets

COMPUTER SYSTEM HAVING A REMOTE REBOOT FACILITY WITH BOTH HARD AND SOFT RESET CAPABILITIES

This is a continuation, of application Ser. No. 07/756,506, filed Sep. 9, 1991, now abandoned.

BACKGROUND OF THE INVENTION

This application is related to U.S. Pat. application Ser. Nos. 08/192,072 a continuation of 07/720,259 entitled COMPUTER SYSTEM MANAGER now abandoned, 08/157,335 a continuation of 07/719,240 entitled INNATE BUS MONITORING SYSTEM FOR COMPUTER SYSTEM MANAGER, 07/720,258 entitled IN-BAND/OUT-OF-BAND ALERT DELIVERY SYSTEM, now abandoned 07/719,243 entitled REMOTE CONSOLE EMULATOR FOR COMPUTER SYSTEM MANAGER, and 07/719,394 entitled POWER SUPPLY FOR COMPUTER SYSTEM MANAGER, now U.S. Pat. No. 5,283,905 all of which were filed on Jun. 24, 1991, assigned to the assignee of the present invention and hereby incorporated by reference as if reproduced in their entirety.

This application is further related to co-pending U.S. patent application Serial Nos. 07/756,488, entitled NETWORK PROTOCOL FOR COMPUTER SYSTEM MANAGER, now U.S. Pat. No. 5,309,563; 07/757,066, entitled POWER SUPPLY FOR COMPUTER SYSTEM MANAGER, now U.S. Pat. No. 5,272,382; and 07/756,509 entitled ASYNCHRONOUS PROTOCOL FOR COMPUTER SYSTEM MANAGER, now U.S. Pat. No. 5,257,384, all of which were filed on even date herewith, assigned to the assignee of the present invention and hereby incorporated by reference as if reproduced in their entirety.

1. Field of the Invention

The present invention relates to remote console emulation systems and, more particularly, to means for re-booting the host within such systems.

2. Description of Related Art

In the past, digital data processing systems, or computers, were large and expensive systems including one or only a few central processor units connected to a main memory, mass storage such as disk and tape units, and input/output units such as printers, video display terminals, and telecommunications; links. Because of the cost of such systems, they typically supported a number of users, and a significant amount of design effort went into making them faster. However, as more parts of the computers were put into integrated circuit chips, including entire central processor units, the cost of computers declined dramatically, and so it became cost effective in many applications to devote a single computer to one or only a few users.

A benefit of having all users using a single large computer system is that data and programs may be shared among a number of users. This benefit can also be realized in an environment of smaller computers if they are linked together, for example, to form a distributed system. In a distributed system, the system is controlled by a host computer which provides services to remote consoles or satellite computers, such as data and programming sharing, and scheduling of resources such as printers and the like. In addition, the host may assist the remote consoles in booting, that is, in obtaining their operating systems when they (the remote consoles) initially begin operating. The operating system programs are programs which are used to control the remote systems, including transfers to other devices in the distributed systems. Of course, it is important for host computers also to be booted.

Emulation is well known to those skilled in the computer arts as the imitation of all or part of one computer system by another system so that, for example, the imitating computer system accepts the same data, executes the same programs, and achieves the same results as the imitated system.

Emulation has heretofore been used with respect to consoles. That is, secondary or remote consoles have been added to host systems and have been caused to operate by emulation of the host's primary console. Via such mechanisms, increased control over host systems can be exercised with relative efficiency and ease.

One aspect of effecting remote console control over host systems is causing booting of the host system to occur. Heretofore, network management packages have been developed that can boot systems, but the practical utility of such systems is low because a high degree of system operation is required to exercise the capability. For example, these packages require at least some software running in the host system in order to operate. This causes further shortcomings and deficiencies. The required host software must be appropriately tailored for the individual host with which it is to be used, which increases complexity and cost of development and installation, and decreases host performance. Additionally, because host running software is required for bootings, if the host fails, booting cannot be effected. Based on the foregoing, it is a shortcoming and deficiency of the prior art that remote booting systems have not heretofore operated independently of the host system and/or with very low system operation requirements.

SUMMARY OF THE INVENTION

The present invention overcomes the shortcomings and deficiencies of the prior art by providing a remote system reboot facility that effects reboots by resetting the central processing unit within a local or host console and by effecting a bus reset. The remote system reboot facility of the present invention is actuated by signals transmitted over an asynchronous line from a remote console to a computer system manager within the host. The computer system manager, and possibly also a keyboard controller associated with the computer system manager, generates or generate the reset signal. Effectively, cold booting is accomplished in embodiments of the present invention by the remote simulating a power cycling on the host and warm booting is accomplished by emulation of "control"—"alt"—"del" keystrokes.

Accordingly, it is an object of the present invention to provide a simple, but effective remote system reboot facility.

Another object of the present invention is to provide a remote system reboot facility that has low system operation requirements.

Yet another object of the present invention is to provide a remote system reboot facility that does not require any software on the host system.

BRIEF DESCRIPTION OF THE DRAWINGS

The invention may be better understood and its numerous objects, features and advantages become apparent to those skilled in the art by referencing the accompanying drawings in which.

DETAILED DESCRIPTION OF THE INVENTION

Figure 1:
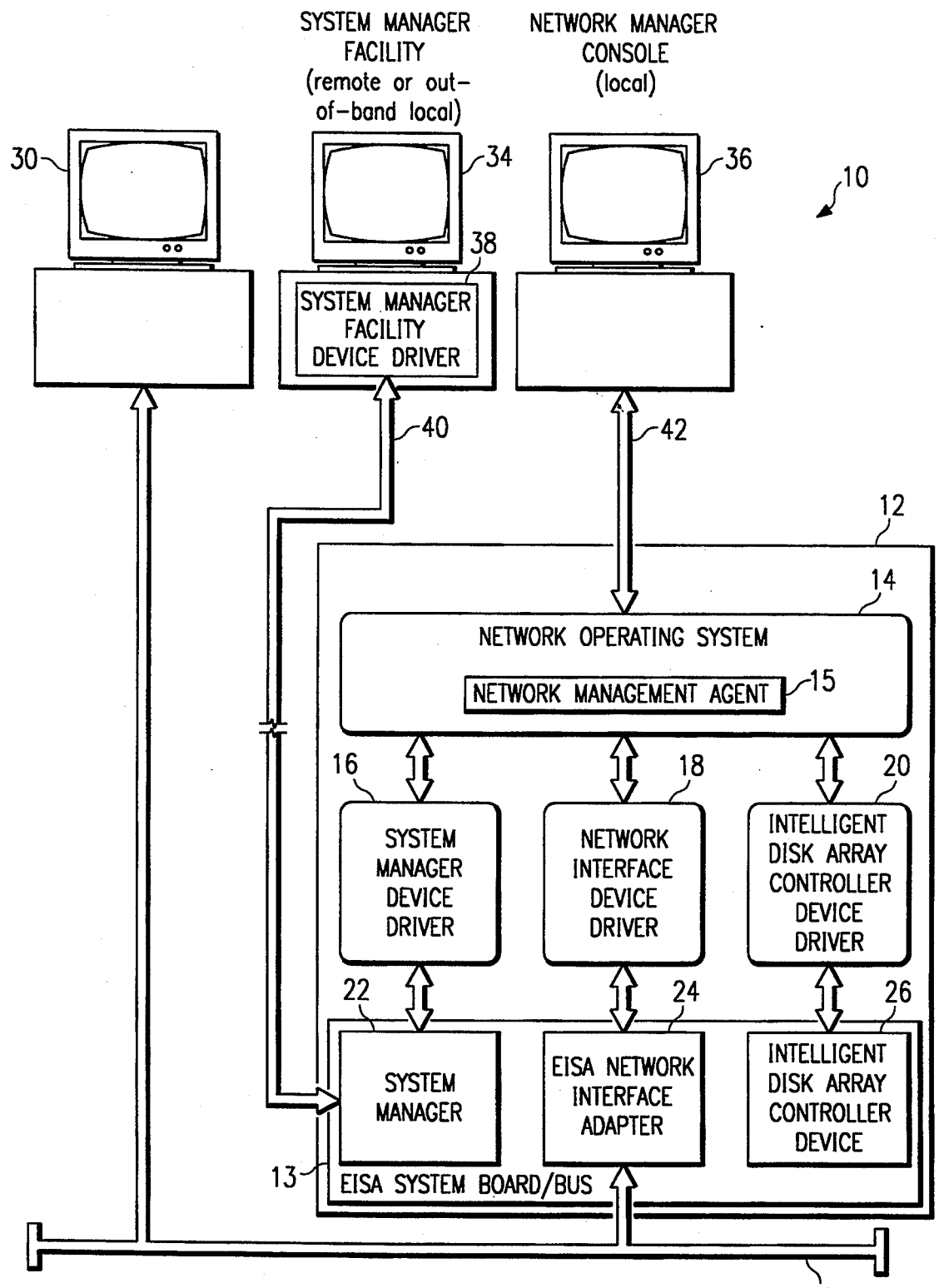
FIG. 1 is a block diagram of a computer network having an EISA based computer system and a computer system manager installed therein.

Referring first to FIG. 1, an extended industry standard architecture (or "EISA") based computer network 10 having a system manager 22 shall now be described in detail. The computer network 10, which may be configured as either a LAN, WAN, or other type of network configuration, includes an EISA server 12 having an EISA system board/bus 13. It should be noted that the EISA system board and EISA system bus are, in reality, distinct structures. However, for ease of illustration they are shown in FIG. 1 as a unified element. Henceforth, to facilitate understanding, references to element 13 shall specifically indicate which portion of the unified element is being considered.

Installed on the EISA system board 13 are a plurality of cards including a system manager 22, an EISA network interface adapter 24, and an intelligent disk array controller device 26. Also running on the EISA server 12 is a network operating system 14, which is shown to include a network management agent 15.

Interconnecting the system manager 22 and the network management agent 15 is a system manager device driver 16. The system manager device driver 16 acts as a bi-directional translator for all requests to and from the system manager 22, thereby providing two-way communication between the system manager 22 and the network management agent 15. Through this interconnection between the system manager 22 and the network management agent 15, the network manager 15 may store information in, or receive information collected by, the system manager 22. Object management by the system manager 22 may, therefore, be performed by the network management agent 15 by issuing instructions to create, modify, reset, or clear objects stored in the system manager 22.

The network management agent 15 also operates as a central collection point for the EISA server's network management information by acting as a link between the system manager 22 and other cards installed on the EISA system board 13 and the host computer network. More specifically, also installed on the EISA system board 13 in the network shown in FIG. 1 are an EISA network interface adapter 24 and an intelligent disk array controller device 26. The network operating system 14 connects the EISA system board 13 and, via network interface device drive 18 which operates in a manner similar to the system manager device driver 16, the network interface adapter 24 for two-way data transmission therebetween. Furthermore, as the network interface adapter 24 is connected for two-way data transmission with the network 28, a two-way communication link between the system manager 22 and the network 28 is thusly provided. The network 28 is the interface of the network component via the network media. The network 28 may be configured in a Token Ring, Ethernet or other network topology in use today, to control the access of multiple computer stations to the network 28, although, in the embodiment of the invention described and illustrated herein, a single computer station 30 has been provided.

An intelligent disk array controller device driver 20 which, like the network interface device driver 18, operates in a manner similar to the system manager device driver 16, provides for two-way data transmission between the system manager 22 and, via The network operating system, the intelligent disk array controller device 26. The intelligent disk array controller device 26 provides disk storage for the EISA system board. 13.

Also shown in FIG. 1 are a local network manager console 36 and a remote system manager console 34. The local network manager console 36 is connected to the network operating system 14 by an in-band network 42. The remote system manager console 34, with an associated remote console device driver 38, is connected to the system manager 22 by an out-of-band, asynchronous line 40.

Figure 2:
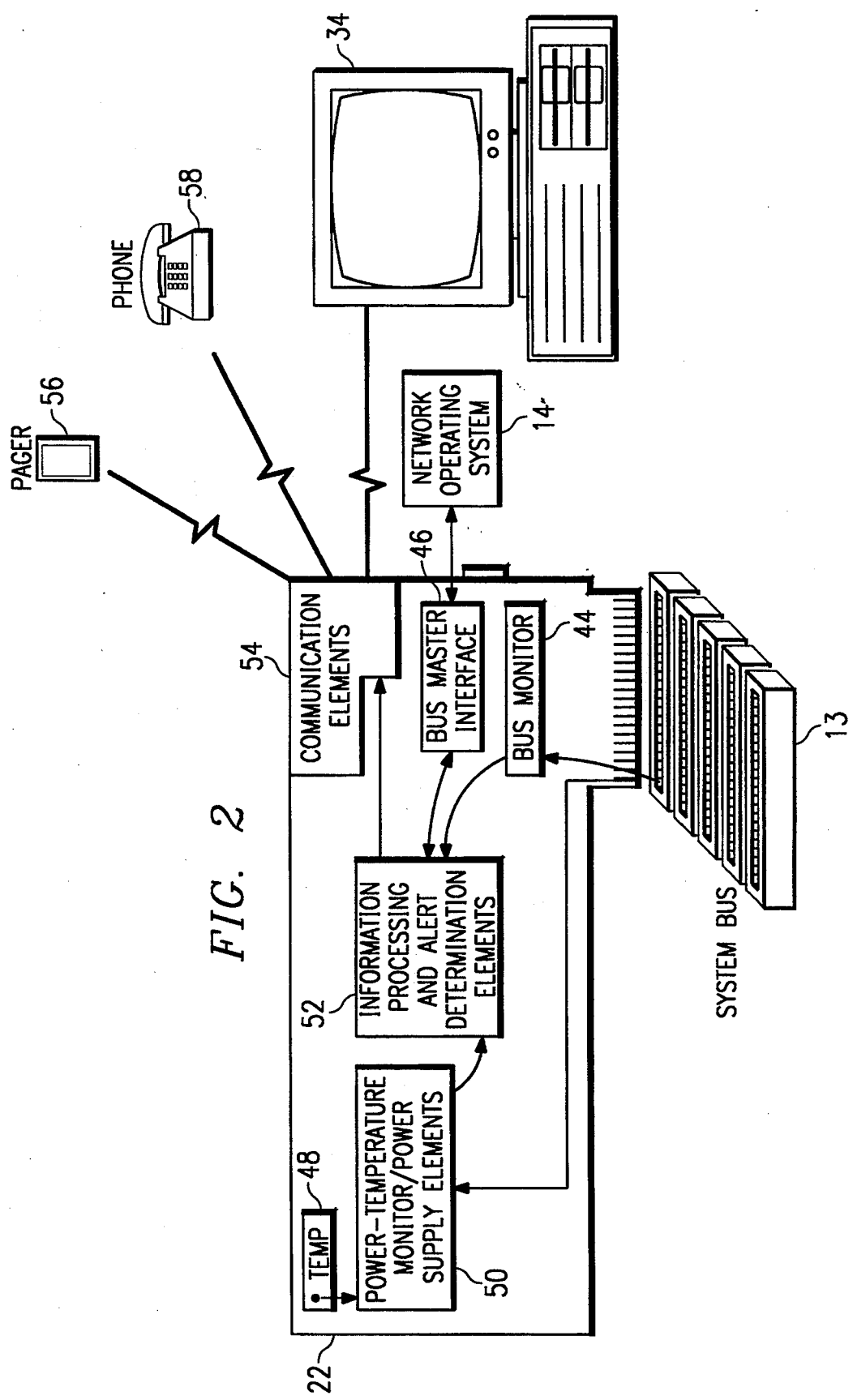
FIG. 2 is a block diagram of the system manager of FIG. 1 which illustrates information flow to and from, as well as within, the system manager.

Referring next to FIG. 2, the flow of data and alerts within the system manager shall now be briefly described. As discussed in detail in other of the related cases, the system manager 22 has the ability to monitor system components and parameters. If a component experiences a failure or exhibits characteristics that indicate it may experience a failure, the system manager detects the failure or characteristic indicative of a potential failure and reports it to a system administrator so that corrective action can be taken.

As may be seen in FIG. 2, data which may be utilized to monitor system components and/or parameters indicative of potential failures may be supplied to the system manager 22 along four paths. First, the EISA bus 28 supplies certain signals to a bus monitor 44 which help determine the state of the system. These signals are then transferred to processor and supporting logic 52 where determination of alert conditions are determined. If an alert condition is determined by the processor and supporting logic 52, an alert condition is issued to communication element 54 where an alert is issued. Asynchronous or out-of-band alerts may be delivered to the system monitor 34, a pager 56 or to a phone 58.

Other signals for which alert conditions may be determined may be delivered to the processor and supporting logic 52 by alternate paths. For example, system temperature is monitored by a temperature monitor 48 and transmitted to power/supply elements 50 where analog to digital conversion of the temperature data is delivered. Also transmitted to the power/supply elements 50 are certain power signals which indicate whether the system manager is receiving power from the EISA bus 28. These signals are transmitted to the processor and supporting logic 52 for determination of alert conditions as well.

Finally, a bus master interface 46 is used to transfer certain data from the network management system to the processor and supporting logic 52.

According to the teachings of the present invention, through the link between the communications elements 54 of the system manager 22 and the remote console 34, significant control of the system manager 22 can be performed from a remote location. From the remote console 34, remote console emulation, access to stored data and remote control or "rebooting" may be performed. Remote console emulation or "hard key insertion" permits keystrokes at the remote console to be delivered to the system manager 22 as if they were input locally. Through the hard key insertion, "soft" reboots are emulated by inserting "control"—"alt"—"del" keystrokes to actuate a reboot of the system manager 22. Additionally, the remote console 34 allows a cold boot to be effected by letting a remote user simulate the effect power of cycling on the host. Further details regarding the remote system reboot facility are set forth herein below.

Figure 3:
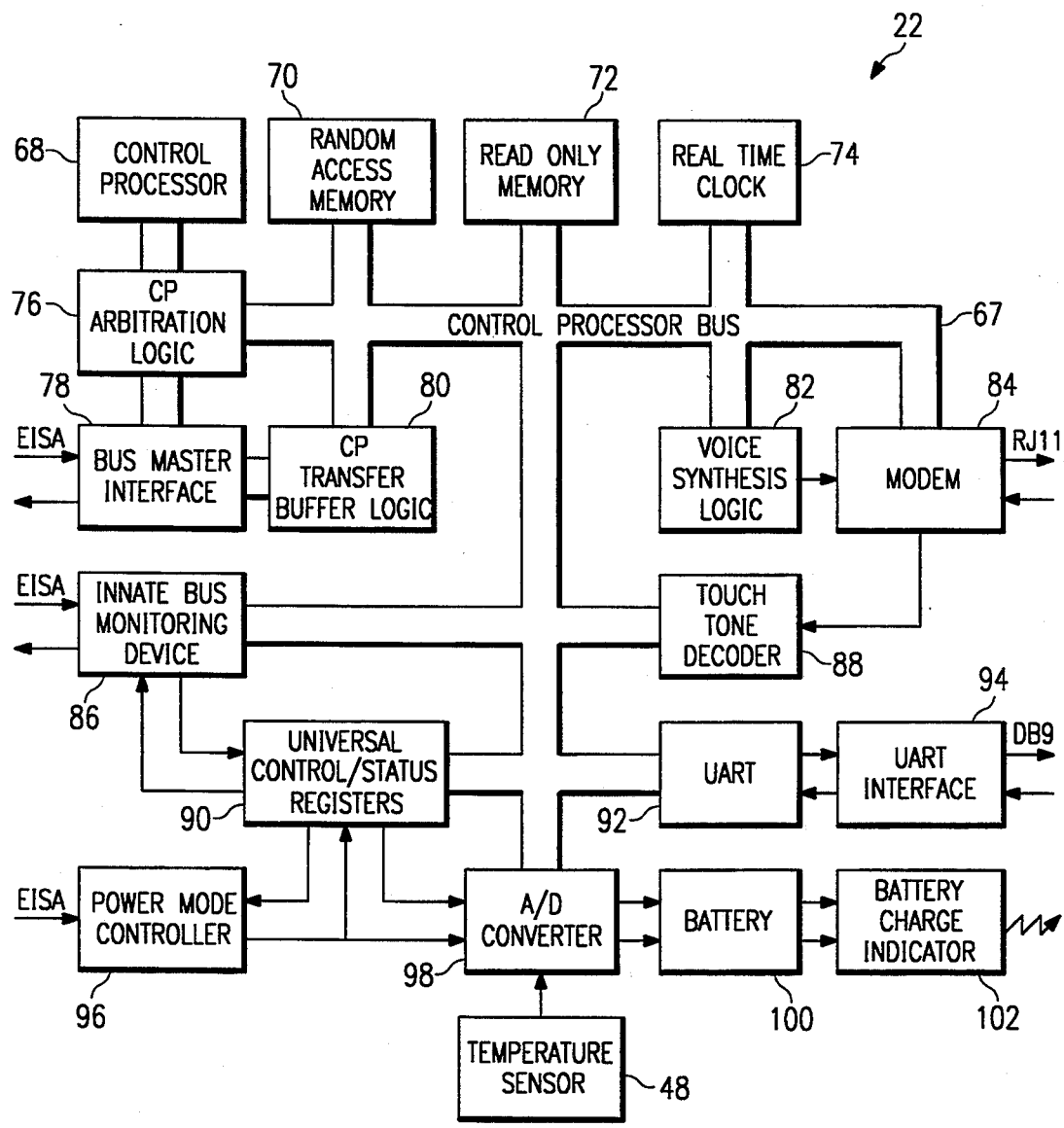
FIG. 3 is a low level block diagram of the system manager of FIGS. 1 and 2.

Referring next to FIG. 3, the structural configuration of the system manager 22 shall now be described in greater detail. The system manager 22 is comprised of a bidirectional control processor bus 67 and a series of system manager components connected to the control processor bus 67 for the transfer of address, data and control signals between various components of the system manager 22. Connected to the control processor bus 67 are a control processor 68, random access memory 60, read only memory 72, a real time clock 74, control processor arbitration logic 76, a bus master interface 78, control processor transfer buffer logic 80, voice synthesis logic 82, a modem 84, a host bus monitor 86, a touch tone decoder 88, universal control/status registers 90, a universal asynchronous receiver transmitter (or "UART") 92, a UART interface 94, a power mode controller 96, an analog-to-digital converter 98; and indirectly a battery 100 and a battery charge indicator 102.

Because the related cases are filled with details regarding the structure and operation of the system manager 22, only those details shown in FIG. 3 that are directly pertinent to the present invention shall be discussed herein. Recognizing that the present invention involves emulation of the local console 36 by the remote console 34 (see FIG. 1) insofar as "soft" or "warm" reboots area concerned, the system manager 22 is disposed between those two consoles 36, 34 with the local console 36 interfacing with the bus master interface portion 78 of the system manager 22, and with the remote console 34 interfacing with the modem 78 or UART portions 92, 94 of the system manager 22. The system manager's local memory 70, 72, which is connected to the control processor bus 67, also plays a role in transfer of video signals in embodiments of the present invention as is discussed further below. Additionally, logic 76, 80 within the system manager 22 that is associated with the bus master interface 78 allows for bus master input/output transfers within the overall data communications network.

Figure 4:
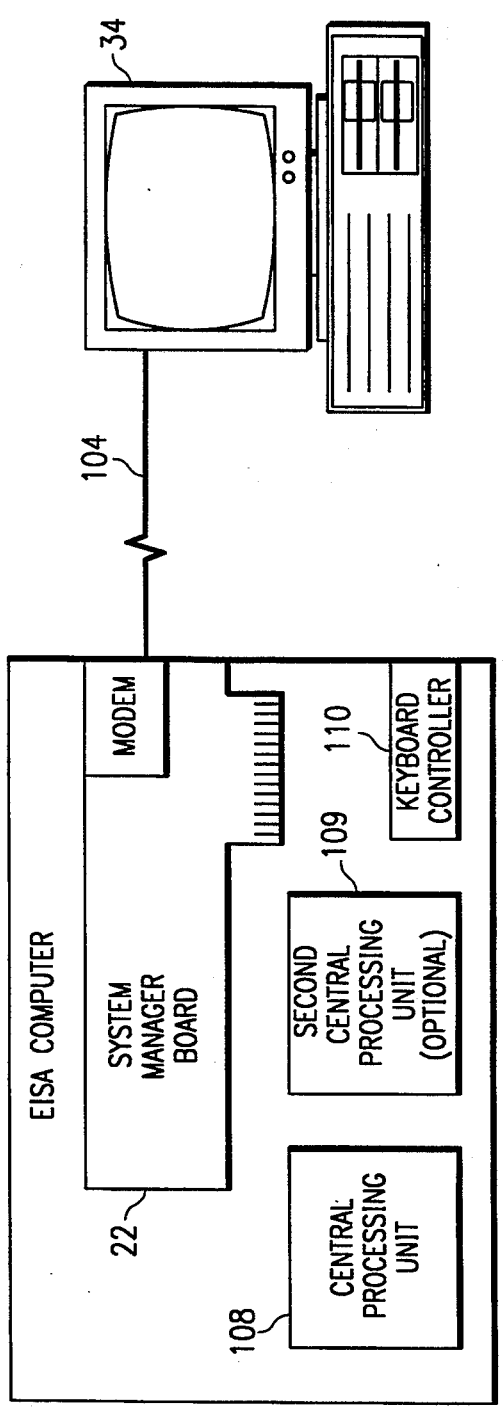
FIG. 4 is a partial block diagram of components in an embodiment of the present invention.

Referring next to FIG. 4, there is shown a partial block diagram of components in an embodiment of the present invention. Like FIG. 2, FIG. 4 shows a remote console 34 and an asynchronous line 104 interconnecting the remote console 32 and a system manager board 22 mounted in an EISA computer 106. The computer 106 includes, in addition to the system manager board 22, a central processing unit 108, and a keyboard controller 110. The various elements forming the computer 106 are interconnected via conventional EISA bus lines (not shown).

System reboots in embodiments of the present invention begin by issue of a command by and from the remote console 34. As both warm and cold reboots may be effected by embodiments of the present invention, the command from the remote console 34 must specify whether a warm or cold start is to be performed in the host 106. As a practical matter, the command may issue from the remote console 34 by selection of an option on a menu displayed at the console 34 when operating in remote console emulation mode.

By way of example only, the actuation of rebooting in embodiments of the present invention may involve both a command from the remote console 34 and a response from the board 22. The command from the remote console 34 may comprise a command tag and a method field specifying whether a warm or cold reboot is requested. The response from the board 22 may comprise a command tag and a result code. In embodiments of the present invention it may be useful to have result codes indicating "success" (to issue, e.g., when the host is rebooting), "illegal" (to issue, e.g., when the remote console function is inactive), "abort" (to issue, e.g., when the command either cannot be supported or cannot be processed), "invalid parameters" (to issue, e.g., when the requested method is not supported), and "access violation" (to issue, e.g., when an activate session command or the like has not issued or has not been properly completed first).

Figure 5:
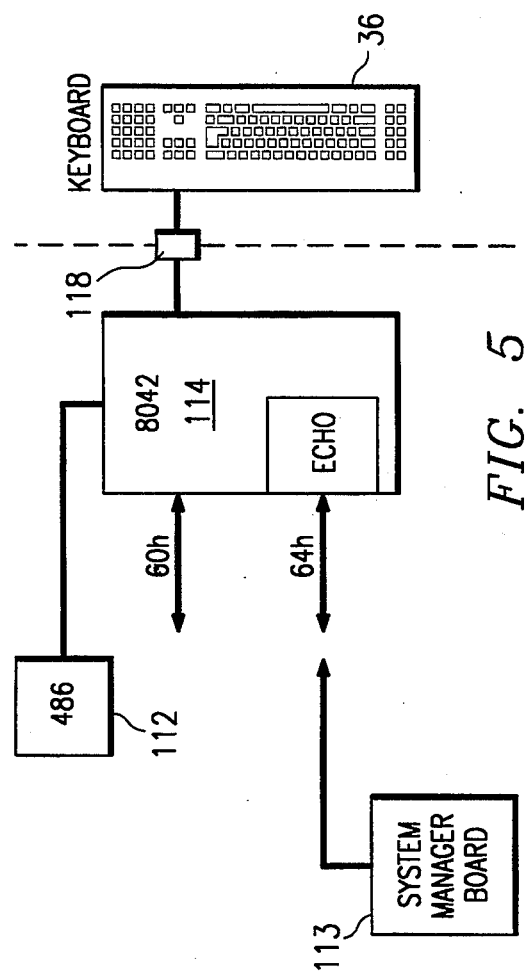
FIG. 5 is a block diagram illustrating keystroke insertion in an embodiment of the present invention.

Warm rebooting, as mentioned above, may be effected in embodiments of the present invention by emulation of "control" —"alt" —"del" keystrokes. With respect to transfer of keystrokes, reference should now be made to FIG. 5. FIG. 5 shows a keyboard 36 interconnected to a conventional keyboard controller 114 via a conventional serial port 118. In normal practice, as is well known to those skilled in the art, keystrokes from keyboard. 36 are directly transmitted to the controller 114 wherein they may be accessed and used by the host CPU 112. In embodiments of the present invention, keystrokes are inserted into the above chain by taking over the system bus and by issuing separate commands in a bus I/O transfer. More specifically, in embodiments of the present invention the board 113 issues an echo command which indicates a simulated keystroke follows. By this mechanism, the board 113 effectively "tricks" the host system into thinking keystrokes from board 113 (and, of course, ultimately from the remote console 34, which sends those keystrokes to be simulated to the board 113 over the asynchronous line 116) came from the local console keyboard 36.

Cold rebooting is effected in embodiments of the present invention by the remote user simulating the effect of power cycling on the host. The inventors of the present invention have developed two specific ways of doing this, both of which will be described in detail below. Both ways involve two basic steps: resetting the host CPU and resetting the board on the bus by asserting an RST DRV signal.

In one of the two specific ways to practice the present invention the bus reset is done by the system manager 22. More specifically, this embodiment of the present invention involves (1) the system manager stopping each processor (it should be noted that there may only be one processor but, alternatively, there may be a plurality of processors; this fact is indicated, in part, by the second central processing unit 109 shown in FIG. 4) by slowing the processor clock(s), (2) the system manager disabling NMI (Non-maskable Interrupt) timeout, (3) the system manager causing a reset drive with an RST DRV signal, (4) the system manager enabling A20 in the keyboard controller (by way of example only, a conventional Intel 8042 controller), (5) the system manager re:setting and holding a second processor if there is one, (6) the system manager setting the CMOS boot flag to 00, (7) the system manager clearing the ROM Bios variable 40:72 (Byte), (8) the system manager resetting the first or only processor, (9) the system manager deasserting the RST DRV signal, and (10) the system manager releasing the first processor. It should be noted that steps 4 and 8 are performed by the keyboard controller in a preferred embodiment of the present invention. Additionally, the above steps may need to be modified to ensure that all processors within a system are reset, recognizing that the number of such processors may be variable.

In the other of the two specific ways to practice the present invention, the system ROM effects bus resetting. More specifically, this embodiment of the present invention involves (1) the system manager stopping each processor by slowing the processor clock, (2) the system manager disabling NMI (Non-Maskable Interrupt) timeout, (3) the system manager enabling A20 in the keyboard controller, (4) the system manager resetting and holding a second processor, (5) the system manager setting the CMOS boot flag to 0C, (6) the system manager clearing the ROM Bios variable 40:72 (Byte), (7) the system manager resetting the first processor, and (8) the system manager releasing the first processor. As with the other way of practicing the present invention discussed above, it should be noted with respect to this way that the keyboard controller may perform steps (3) and (7) and, furthermore, the steps may need to be modified to ensure that all processors within a system are reset.

Those skilled in the art should appreciate how the present invention affects remote system rebooting. Those skilled in the art should further appreciate that rebooting as taught herein constitutes a marked improvement over prior art methods, but particularly because it does not require a high level of system operation or software on the host system.

Those skilled in the art will recognize that many modifications and variations besides those specifically mentioned above may be made in the techniques described herein without departing substantially from the concept of the present invention. Accordingly it should be clearly understood that the form of the invention as described herein is exemplary only and is not intended as a limitation on the scope of the invention.

What is claimed is:

1. For a computer network having at least one computer system operatable therein, said computer system having a plurality of components interconnected by a system bus for the transferring of information between said components, said computer system further having a local console and a remote console, said local console being connected to the system bus and said remote console being connected to the computer system via an asynchronous line, said local console having a local central processing unit and a system board therein, a remote system reboot facility comprising:

means for resetting said local central processing unit, said means for resetting disposed within said local console;

means for effecting a bus reset, said bus reset being when said system bus is supplied with a driver reset signal which causes said system board to be reset, said means for effecting disposed within said local console;

means for triggering said means for resetting said local central processing unit, said means for triggering said means for resetting disposed within and independently actuatable at said remote console;

means for triggering said means for effecting a bus reset, said means for triggering said means for effecting a bus reset disposed within and independently actuatable at said remote console;

said asynchronous line interconnecting said means for resetting and said means for triggering said means for resetting, and further, said asynchronous line also interconnecting said means for effecting and said means for triggering said means for effecting, wherein said means for resetting and said means for effecting are independently triggerable via their respective means for triggering located at the remote terminal.

2. A remote system reboot facility as recited in claim 1, wherein said local console further has a computer system manager, and wherein said means for resetting said local central processing unit comprises said computer system manager.

3. A remote system reboot facility as recited in claim 2, wherein said means for effecting a bus reset also comprises said computer system manager.

4. A remote system reboot facility as recited in claim 2, wherein said local console further has a keyboard controller, and wherein said means for resetting said local central processing unit further comprises said keyboard controller, which perform an actuating function therein.

5. A remote system reboot facility as recited in claim 1, wherein said local console further has a computer system manager, and wherein said computer system manager and said remote console are interconnected by an asynchronous line.

6. For a computer network having at least one computer system operatable therein, said computer system having a plurality of components interconnected by a system bus for the transferring of information between said components, said computer system further having a local console and a remote console, said local console being connected to the system bus and sail remote console being connected to the computer system via an asynchronous line, said local console having a local central processing unit and a system board therein, a remote system reboot facility comprising:

means for resetting said local central processing unit, said means for resetting disposed within said local console;

means for effecting a bus reset, said bus reset being when said system bus is supplied with a driver reset signal which causes said system board to be reset, said means for effecting disposed within said local console;

means for triggering said means for resetting said local central processing unit, said means for triggering said means for resetting disposed within and independently actuatable at said remote console;

means for triggering said means for effecting a bus reset, said means for triggering said means for effecting a bus reset disposed within and independently actuatable at said remote console;

said asynchronous line interconnecting said means for resetting and said means for triggering said means for resetting, and further, said asynchronous line interconnecting said means for effecting and said means for triggering said means for effecting, wherein said means for triggering said means for resetting said local central processing unit and said means for triggering said means for effecting a bus reset are independently actuatable.

7. A remote system reboot facility as recited in claim 6, wherein said local console further has a computer system manager, and wherein said means for resetting said local central processing unit comprises said computer system manager.

8. A remote system reboot facility as recited in claim 7, wherein said means for effecting a bus reset also comprises said computer system manager.

9. A remote reboot facility as recited in claim 7, wherein said local console further has a keyboard controller, and wherein said means for resetting said local central processing unit further comprises said keyboard controller, which performs an actuating function therein.

10. A remote system reboot facility as recited in claim 6, wherein said local console further has a computer system manager, and wherein said computer system manager and said remote console are interconnected by an asynchronous line.

* * * * *